(12) United States Patent
Wilson et al.

(10) Patent No.: US 8,504,921 B2
(45) Date of Patent: *Aug. 6, 2013

(54) SYSTEM AND METHOD FOR HOME AUTOMATION

(75) Inventors: Brian B. Wilson, San Antonio, TX (US); Carlton L. Brown, San Antonio, TX (US); Jeffrey Multach, San Antonio, TX (US); Mark B. Hubscher, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/267,713

(22) Filed: Oct. 6, 2011

(65) Prior Publication Data

US 2012/0262628 A1 Oct. 18, 2012

Related U.S. Application Data

(63) Continuation of application No. 11/281,995, filed on Nov. 17, 2005, now Pat. No. 8,042,048.

(51) Int. Cl.
*G06F 15/177* (2006.01)

(52) U.S. Cl.
USPC ........... 715/736; 715/733; 715/734; 715/744; 700/17; 700/19; 700/83; 348/552

(58) Field of Classification Search
USPC .............................. 715/736; 700/17; 348/552
See application file for complete search history.

(56) References Cited

U.S. PATENT DOCUMENTS

| | | | |
|---|---|---|---|
| 6,198,479 B1 | 3/2001 | Humpleman et al. | |
| 6,263,502 B1 * | 7/2001 | Morrison et al. | 725/47 |
| 6,473,661 B1 | 10/2002 | Wollner | |
| 6,580,950 B1 | 6/2003 | Johnson et al. | |
| 6,640,145 B2 | 10/2003 | Hoffberg et al. | |
| 6,756,998 B1 | 6/2004 | Bilger | |
| 6,792,319 B1 | 9/2004 | Bilger | |
| 6,823,223 B2 * | 11/2004 | Gonzales et al. | 700/86 |
| 6,868,292 B2 | 3/2005 | Ficco et al. | |
| 6,889,207 B2 | 5/2005 | Slemmer et al. | |
| 6,909,921 B1 | 6/2005 | Bilger | |
| 6,912,429 B1 | 6/2005 | Bilger | |
| 6,990,335 B1 * | 1/2006 | Shamoon et al. | 455/419 |
| 7,260,604 B2 * | 8/2007 | Kuki | 709/205 |
| 7,298,252 B1 * | 11/2007 | Sutardja et al. | 340/506 |
| 2001/0034754 A1 * | 10/2001 | Elwahab et al. | 709/201 |
| 2003/0005099 A1 * | 1/2003 | Sven et al. | 709/223 |
| 2003/0041107 A1 | 6/2003 | Johnson et al. | |
| 2003/0229900 A1 * | 12/2003 | Reisman | 725/87 |
| 2004/0031058 A1 * | 2/2004 | Reisman | 725/112 |
| 2005/0036069 A1 * | 2/2005 | Lee et al. | 348/632 |
| 2005/0125083 A1 * | 6/2005 | Kiko | 700/19 |
| 2006/0080408 A1 * | 4/2006 | Istvan et al. | 709/219 |
| 2007/0043687 A1 * | 2/2007 | Bodart et al. | 707/1 |
| 2007/0047520 A1 * | 3/2007 | Byers et al. | 370/352 |
| 2007/0079340 A1 * | 4/2007 | McEnroe | 725/78 |

* cited by examiner

*Primary Examiner* — Alvin Tan
(74) *Attorney, Agent, or Firm* — G. Michael Roebuck

(57) ABSTRACT

A home automation system and method are disclosed for configuring a device state including but not limited to receiving an input from the client device at the server, configuring the device state in the database at the server in accordance with the input, and sending the configured device state from the server to the client device.

9 Claims, 14 Drawing Sheets

SYSTEM AND METHOD FOR HOME AUTOMATION

CROSS REFERENCE TO RELATED APPLICATIONS

This application is a continuation of U.S. patent application Ser. No. 11/281,995, filed Nov. 17, 2005, now U.S. Pat. No. 8,042,048 by Wilson et al., entitled SYSTEM AND METHOD FOR HOME AUTOMATION, which is hereby incorporated by reference in its entirety.

BACKGROUND

1. Field of Disclosure

The disclosure relates to the field of home automation systems.

2. Description of the Related Art

Current home automation systems typically provide a graphical user interface (GUI) a display device, processor, and a remote control to access the home automation system GUI. The GUI may be stored locally on the processor to provide access to home automation and security features. The GUI also provides access to video, pictures or music stored on the media center. Current home automation systems may use elaborate specialized controllers, expensive liquid crystal display (LCD) panels, and media centers that may not be affordable for most homeowners. Many existing home automation systems and controllers use extensive, complex programming only available through on-site or remote service.

BRIEF DESCRIPTION OF THE DRAWINGS

For detailed understanding of the illustrative embodiment, references should be made to the following detailed description of an illustrative embodiment, taken in conjunction with the accompanying drawings, in which like elements have been given like numerals.

DETAILED DESCRIPTION OF THE DRAWINGS

Figure 1:
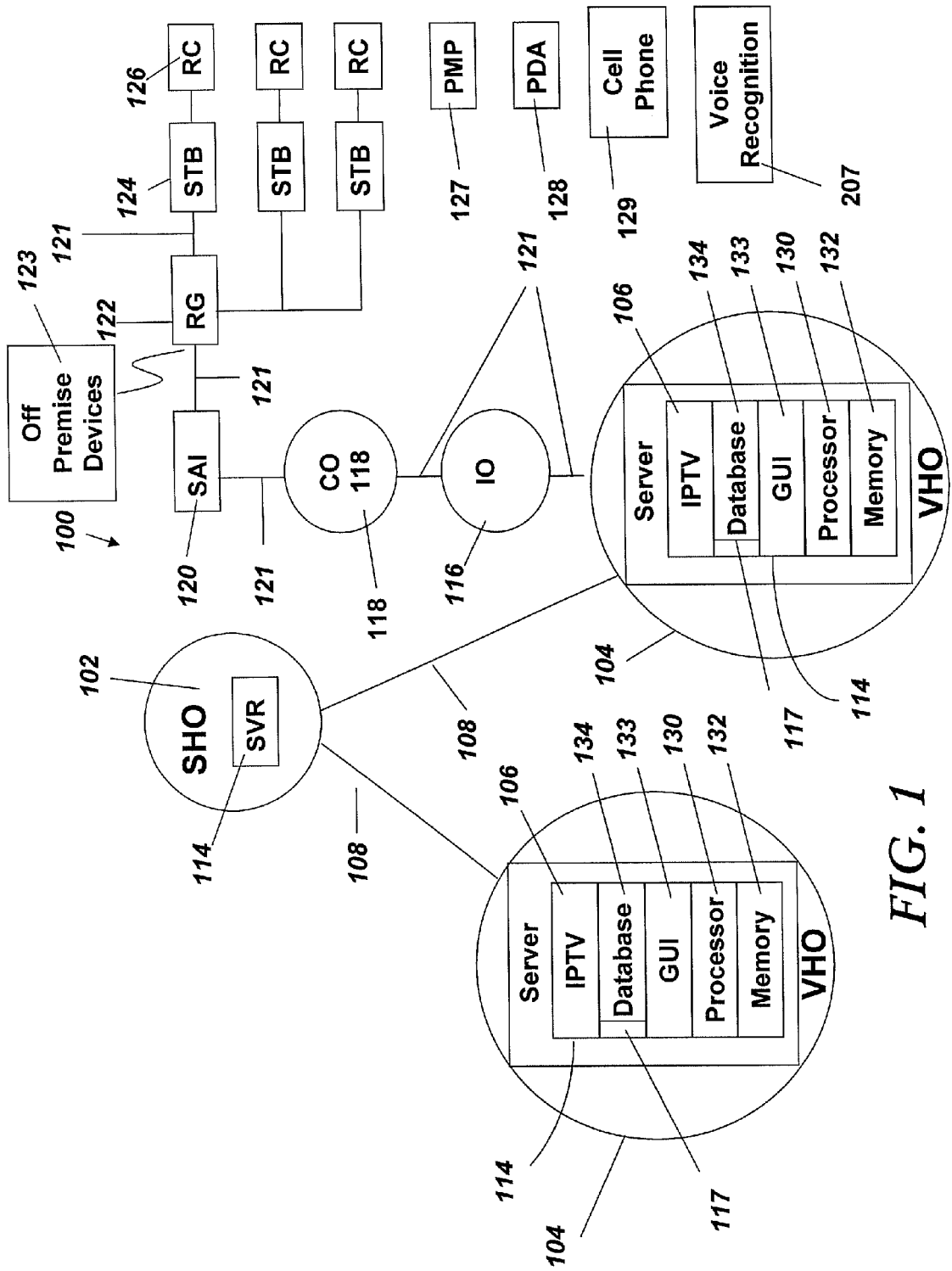
FIG. 1 is a schematic diagram depicting of an illustrative embodiment showing an interactive protocol television network.

In view of the above, an illustrative embodiment is presented through one or more of its various aspects to provide one or more advantages, such as those noted below. In one embodiment a method is presented for configuring a device state of a home automation controllable device including accessing a graphical user interface (GUI) from a database at a server, sending the GUI from the server to a client device, receiving an input from the client device at the server, configuring the device state in the database in accordance with the input, and sending the configured device state to the client device. The client device may be a set top box (STB) as shown in FIGS. 1-4 herein. While embodiments dealing with homes are disclosed herein, it should be understood that the techniques are applicable in other environments including but not limited to businesses, schools and other environments wherein consumer electronic devices can be controlled as controllable devices.

In a particular embodiment the method includes an input which may be a GUI input, a business rule, an event, a content selection, a context and a device state. The GUI may be an Internet protocol television (IPTV) GUI. In another particular embodiment the method includes applying a business rule to the input and a context. In another particular embodiment the context includes at least one selected from the set consisting of a scheduled content time, content characterization, event, and event participant. In another particular embodiment the method includes sending content to the client device. In another particular embodiment the method includes reporting context to a data base and sending global messages to the client based on the reported context.

In another particular embodiment a database is provided for storing a device states, context and business rules. A server is coupled to the database, a first server interface is provided to send a GUI from the server to a client device, a second server interface is provided to access a graphical user interface (GUI) in the database, a third server interface is provided to send the GUI to a client device, a fourth server interface is provided to receive an input from the client device at the server, and a fourth interface is provided to configure the device state in at the database server in accordance with the input, and a fifth server interface is provided to send the configured device state to the client device.

In another particular embodiment the input is selected from one of the set consisting of a GUI input, business rule, event, video content selection, context and device state. The GUI further can be an Internet protocol television (IPTV) GUI. In another particular embodiment a business rule is applied to the input and a context. In another particular embodiment the context can include but is not limited to scheduled video content time, video content characterization, event, and event participant. In another particular embodiment a server interface to send video content to the client device, to report context to a database and to send a global message to the client based on the reported context.

In another aspect of a particular embodiment a data structure is presented for storing a device state of a home automation controllable device having a device identifier field for identifying a device in the device state, a device mode field for storing an operational mode for the device, and a context field for storing a context. In another particular embodiment the database includes but is not limited to a business rule field for storing a business rule for application to the context and the input.

In another particular embodiment a method of configuring a device state of a home automation controllable device is disclosed and includes receiving a graphical user interface (GUI) from server at a client device, sending an input from the client device to the server for configuring the device state in the database in accordance with the input, and receiving the configured device state to the client device.

In another particular embodiment the input is at least one of the set consisting of a GUI input, business rule, event, video content selection, context and device state. In another particular embodiment the GUI further can be an Internet protocol television (IPTV) GUI. In another particular embodiment the method includes receiving content from the server at the client device, sending context from the client device to the database and receiving a global message at the client based on the reported context.

In another particular embodiment a system for configuring a device state of a home automation system controllable device is disclosed having a database for storing a plurality of device states, context and business rules. In another particular embodiment structure is presented for storing a device state in a database having a device identifier field for identifying a device in the device state, a device mode field for storing an operational mode for the device, and a context field for storing a context. In another particular embodiment the database includes but is not limited to a business rule field for storing a business rule for application to the context and an input. In another particular embodiment a server is coupled to the database wherein the server has a processor, a computer readable medium coupled to the processor, a computer program embedded in the computer readable medium, the computer program having instructions to receive a GUI from a server at a client device, instructions to receive the input from the client device from the server, to configure the device state in the database at the server in accordance with the input, and instructions to receive the configured device state at the client device.

In a particular illustrative embodiment a home automation system is provided to configure controlled devices in a home. A particular illustrative embodiment includes but is not limited to a client device such as a set-top box (STB) and remote control (RC). The STB communicates through a residential gateway (RG) to access a server hosting an internet protocol television (IPTV) platform. An IPTV graphical user interface (GUI) is stored at an IPTV server. Home automation controllable devices (herein after "controllable devices") operational states are represented in a device state data structure stored in a database at the server. The RG and STB receive the device state from the server for all controllable devices in a home. The device state for the controllable devices can be configured and controlled through the GUI. The GUI may be displayed on a television set or a computer through the RG or STB. The GUI enables a subscriber to control the operational state of existing home automation controllers, devices, and security systems from a client device such as an STB.

The illustrative embodiment communicates with the existing controllable devices in the home through a wireless network using wireless protocols or through existing home wiring, or power-line technology, such as Home-Plug and UPB, other communication networks and protocols can be used including X10, Zigbee, ultra wide band (UWB) and Insteon.

The illustrative embodiment can be in-expensively installed and thus is affordable to the average homeowner. The home automation system of the illustrative embodiment can save consumers thousands of dollars in installation costs compared to installation of elaborate home automation systems. The illustrative embodiment is network based and thus enables transparent software upgrades and remote service transparent to a subscriber enabling service without disrupting a subscriber's household for maintenance and upgrades. The illustrative embodiment provides an easy, convenient method for home automation, content selection and security. Home automation programming is provided through simplified GUI control at the server with built-in computer program applications. The illustrative embodiment provides server based computer programs that can provide reporting, analysis, performance, environmental control and evaluation of usage of controllable devices.

The illustrative embodiment provides an IPTV server based home automation system. A graphical user interface (GUI) is provided that resides on an IPTV platform in an IPTV network server. An STB and RC are provided to communicate with the GUI. The GUI is displayed on a television or a mobile display device. A subscriber can conveniently access the GUI to control home automation and content from the comfort of their home sofa or from a remote location. The IPTV server GUI can be accessed via the RG through any STB or television RC location in the home. The GUI can also be accessed remotely through Wi-Fi, local or remote wireless networks. The GUI can be accessed by numerous other client devices including but not limited to personal media players (PMP), advanced remote controls, LCD's, lap-top computers, personal computers, and verbal input through a voice recognition system. Programming the home automation system is simplified as it is initially pre-configured with serviceable default computer programs.

A device state of the home automation controllable devices (hereinafter "device state") is stored in a database at the IPTV server. The device state represents an operational state for each controllable device in the home. The device state can be configured to set controllable devices in various operational states including but not limited to, on, off, variable power or dimmer setting, volume settings, flicker, etc. The device state for the home can be configured using a GUI iconic representation of the home controllable devices appearing in a house floor plan. In an illustrative embodiment, device states can be learned in "context". Learning a device state in context is performed by instructing the GUI to learn, that is, capture and store a particular device state and context representing a set of current controllable device settings for current or future context. For example, a subscriber may set the lights down, turn the television volume up and mute the telephones in his home as he (subscriber "dad") is watching Monday Night Football. He may use the GUI to instruct the illustrative embodiment to learn the device state and context for subscriber, dad, and Monday Night Football.

The home automation system network provides a server database for storing the device states. The device states can be manipulated by accessing the GUI. The GUI resides off-site in the IPTV network server database for on-going software updates and programming. Dedicated STB remote buttons are provided for macros, such as all home lights mode on or panic mode, such as all lights flashing during an intrusion or breach of security. In this case an intrusion alert can be sent to neighbor homes over the IPTV network. Advanced STB remote control is provided for additional features and control including but not limited to intelligent management for energy savings, home theatre control, security control and more.

In one particular embodiment, communication interfaces are provided to existing home automation or security systems. The illustrative embodiment can communicate over existing home wiring using power-line or wireless technologies for controllable devices. The illustrative embodiment provides a database for storing business rules, content, context and device states. The business rules are applied to the content and context to reconfigure the device states in the database.

In a particular embodiment a user can access the GUI to communicate with an STB having a digital video recorder (DVR) and a media server containing video, music, photos, etc. Home automation system reporting and analysis is provided by the home automation system.

Reporting includes reporting on device performance, environmental factors and device usage. Usage reporting can be conducted by individual devices or appliances in the home including but not limited to devices such as, refrigerators, air conditioners, swimming pools and lights. Reporting can be tied to content or context. For example, refrigerator contents can be inventoried by verbal announcement to the voice recognition system or by scanning in by bar code identifying products like in a supermarket checkout line and reported to subscriber on demand. A business rule may be configured to monitor IPTV content and display refrigerator contents when a commercial break is encountered during a football game. Washers, dryers, microwaves, heating/cooling, and pool/hot-tub usage, can be monitored, reported and controlled. A particular embodiment can provide business rules to use weather stations reports to the IPTV server to provide weather related home automation features to change the device state to control shutters during high winds, blinds synchronized with the sun, sprinklers run according to recent cumulative rainfall, windows/ventilation systems, and temperature and humidity control to optimize energy efficiencies.

In another particular embodiment an STB with integrated Home and Media Controller (hereafter referred to as "HMC" and used interchangeably with STB to mean an STB with integrated home and media controller) is provided. The HMC provides an IP based home automation solution that integrates content and advanced home automation control features. HMC automation features include but are not limited to lighting, security, surveillance, temperature, energy management. Video content related controls include but are not limited to home theater control, diagnostics and reporting capabilities. The HMC control seamlessly integrates advanced home theater control and home automation control using standard IR, IP, RF, wireless and power line communication protocols. The HMC can be integrated into an STB which can include but is not limited to an STB used for decoding CATV, IPTV, and/or Satellite video applications. The HMC leverages existing STB functionality and connectivity to consumer A/V electronics including access to personal media content such as internal/external digital video recorder (DVR), personal video recorder (PVR), PMP or storage devices and personal computers.

An HMC is described in the illustrative embodiment which is capable of providing home automation control, and audio/visual (A/V) control and content control to any room in the home through the HMC and a home communication network. In an illustrative embodiment, the HMC integrates infrared (IR), IEEE 1394, RS-232, radio frequency (RF), component video, composite video, S-video, DVI, HDMI, optical, Ethernet, RJ-11, audio in/out, video in/out, and speaker out connectivity to the home theater consumer electronics equipment.

In an illustrative embodiment, the HMC communicates to other STB's and home automation devices throughout the home using communication networks including but not limited to a wireless mess network, Ethernet, Wi-Fi, Zigbee or power line distribution methods including but not limited to Zwave, universal power bus (UPB), and Insteon protocol. The HMC also communicates with and controls, sensors, detectors, thermostats, outlet dimmers, outlet switches, smoke detectors, fire detection systems, video cameras, carbon monoxide detectors, contacts, proximity sensors, security systems, gas detection devices, irrigation equipment, energy measurement, load control, air conditioning, humidity control, heating equipment, dimmer switches, switches, smart appliances, pool/spa, home theater, shades, blinds, drapes, projection screens, mounts, lifts, fan speed, remote dimmers, etc. The HMC can be accessed and controlled by remote controls, remote wireless devices, touch pads, key pads, LCD's, key fobs, PDA's, PMP's, Cell Phones, computers, etc. The HMC may access an IPTV GUI and receive a device state from the IPTV server to configure controlled devices in the home according to the device state.

Turning now to FIG. 1, FIG. 1 is a schematic diagram depicting an IPTV network 100 in accordance with an illustrative embodiment. As shown in FIG. 1, the IPTV network 100 includes but is not limited to a super hub office (SHO) 102 for acquisition and encoding of information and data such as video content; a video hub office (VHO) 104 in each demographic market area (DMA) for delivery of the content; intermediate offices (JO) 116 and central offices (CO) 118 locations in each metropolitan area for distribution of the content; a service area interface (SAI) access network between the COs and multiple or single dwelling units; and the in-home network with residential gateway (RG) 122. The SHO, VHO, IO and CO may be located in separate geographic regions (nation, region, state, metropolitan, and city) to communicate to subscribers over high-speed digital communication lines 108.

A server 114 can be placed at the SHO 102 to acquire and redistribute content to the VHOs 104 which may be spread across a large geographic region such as a country, such as the United States, England or France. The SHO may be provided in a geographically central location for acquisition of national-level broadcast TV programming. The SHO can be the central point of on-demand video content acquisition and insertion of content into the IPTV network. Video content may include but is not limited to all displayable visual and audio content including movies, games and television programs. Video content can be received at the SHO 102 via satellite and processed for delivery to the VHOs 104. On demand video content can be received from various sources and processed for code/decode and bit-rate requirements for the IPTV network for transmission to the VHOs over high-speed communication links 108. Video content from a SHO server 114 can be redistributed to the VHOs 104 toward the subscriber via the intermediate offices (IOs) 116 and the central offices (COs) 118. The COs are connected to the IOs to further distribute video content toward the subscribers.

The VHOs 104 can receive national content from the SHO 102 video server 114. The VHOs are the video redistribution points within each designated market area (DMA) or geographic region. Application systems, regional subscriber database systems, VOD servers, and fast channel-change servers can be located in the VHO. In a particular illustrative embodiment at least one IPTV platform 106 is placed at each VHO server. The video server includes processor 130, memory 132 coupled to the processor 130, database 134, and GUI 133. The memory 132 can include a computer program that is embedded in the memory 132 that can include logic instructions to perform one or more of the method steps described herein. Additionally the database 134 containing the device control state 117 is coupled to the processor 130.

IPTV subscriber activity data can be collected at the IPTV platform 106 from all subscribers associated with a particular server at a VHO and stored in the database 134 for global analysis between multiple IPTV subscribers. Global context and alert messages can be created sent to IPTV subscribers based on a survey of subscriber activity data stored in the database from multiple RGs or IPTV subscribers.

IPTV network content, messages and the device state is communicated to the subscriber RG 122 at least partially via either fiber to the node (FTTN) or fiber to the premises (FTTP) optical communication links. FTTN equipment, located at a serving area interface (SAT), can be connected to the CO. FTTN equipment may also be located in the CO. Toward the subscriber household, a network interface device (NID) and RG 122 with a built-in very high data rate digital subscriber line (VDSL) modem or optical network termination (ONT) can be installed as the customer premise equipment (CPE). In one particular embodiment the RG can be connected to the additional STBs 124 in the home via an internal network such as an Ethernet. Each STB has an associated RC 126 which provides data entry to the STB to control the IPTV selections and GUI from the IPTV platform. Data entry can also be performed by devices such as but not limited to a PMP 127, PDA 128, cell phone 129 and voice recognition 207 system.

Subscriber activity data from a subscriber including but not limited to IPTV GUI inputs, device states, subscriber identification, alerts, IPTV channel selection, IPTV control inputs and IPTV data entry is collected from each STB in a household. The subscriber activity data may be collected and transmitted from the RG to an IPTV platform 106. Subscriber activity data may also include input to the GUI at the IPTV platform from a wireless device located outside of the home. In the illustrative embodiment an IPTV platform 106 exists in each VHO. The subscriber activity data can be collected periodically at each IPTV platform 106 or in real-time from each RG and stored in the database 134.

In the illustrative embodiment, each IPTV platform 106 transmits the subscriber activity data to a single database 134 for global analysis and trending. Global alert messages can be sent as business rules dictate for global events such as severe weather, fire, terrorist threats, Amber alerts, and other global or regional events can be sent to IPTV subscribers based on analysis of subscriber activity data collected at the database 134. Thus a fire alert reported in one IPTV subscriber household can be reported to neighboring IPTV subscriber households. The database 134 may be a commercial database such as provided by Oracle running on a Sun Microsystems processor. Other processors and database systems are suitable for use with the illustrative embodiment as well.

The database periodically collects the subscriber activity data from each VHO. The EDW may also operate in real time to collect the data from the VHOs. The subscriber activity data from each VHO is pulled by the EDW periodically or can be collected in real time and relayed to the EDW. Real time data collection enables real time data analysis for iterative configuration of the device state, global alert messages and dynamic management of content and home automation from the server 114.

The server 114 includes processor 130, memory 132 coupled to the processor 130, database 134, and GUI 133. In a particular embodiment the memory 132 can include a computer program that is embedded in the memory 132 that can include logic instructions to perform one or more of the method steps described herein. Additionally the database 134 is coupled to the processor 130 containing the device control state 117.

The STB 124 may forward the subscriber activity data to the RG which in turn sends the subscriber activity data to IPTV instance 106 via a communication path 121 between the VHO and an associated RG. Substantially all subscriber activity data including but not limited to content selection, device states, business rules and remote control activity is recorded as subscriber activity data at the IPTV platform 106 database. The processor 130 may be implemented as a Sun Microsystems processor. The STB can contain a single microprocessor and memory, or may be implemented as multiple microprocessors and memories located at a single location or at several locations.

A downstream signal from the IPTV platform 106 to a RG, display device or STB includes the GUI, device states, and content for display on the display device. An upstream signal through the RG from the home display device, RG or STB to the IPTV platform includes but is not limited to events, device state and subscriber activity data including but not limited to channel selections, GUI input and any other input from the RC, STB or other remote wireless device with access to the server.

Figure 2:
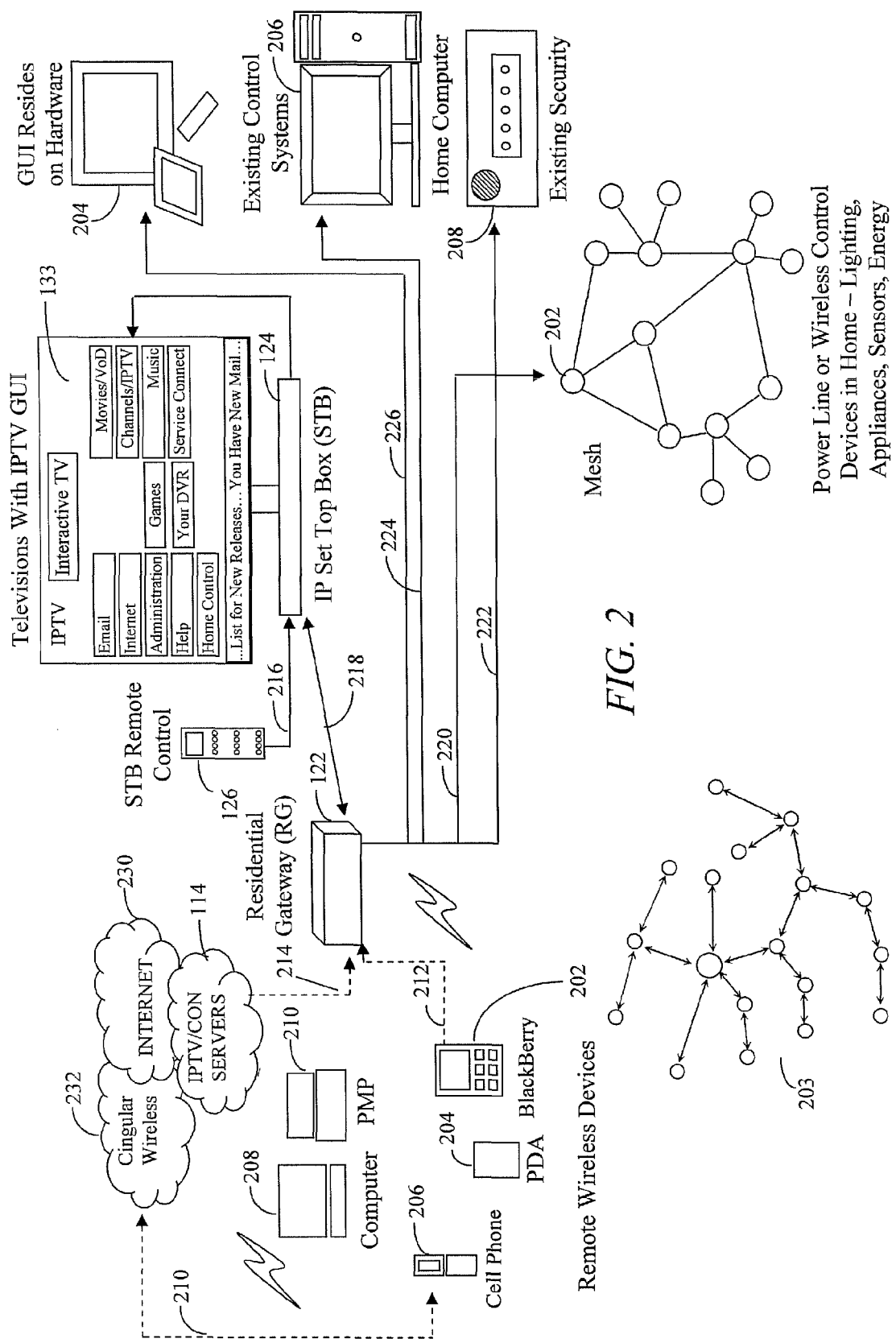
FIG. 2 is a schematic diagram depicting an illustrative embodiment showing a graphical user interface for controlling devices in a home.

Turning now to FIG. 2 in an illustrative embodiment an IPTV GUI 133 is provided from the server 114 to configure the device state 117 and business rules in the database 134. The device state is subsequently sent from the sever to the RG for controlling devices on a wireless mesh network 202, a power line network 203, existing home security system 208, existing control system 204 or a home computer 206. The subscriber uses the IPTV GUI to interact with the IPTV platform 106, which is installed at the server 114 in the VHO 104. A subscriber uses a remote control 126 or remote wireless devices blackberry 202, PDA 204, cell phone 206, computer 208, or personal media player 210 to provide input to the GUI at the IPTV platform 106 on the server 114.

The cell phone 206 interfaces through a wireless network 232 to the IPTV server 114. The remote wireless devices interface through wireless link 212. The IPTV server 114 interfaces with the RG 122 over a network link 214. The RG communicates with a STB 124 over communication link 218. The RC 126 communicates with the set top box 124 over communication link 216. The RG communicates with the wireless mesh network and the power line network 202 over communication link 220. The RG communicates with existing home security over communication link 222. The RG communicates with the home computer system 206 over communication link 224. The RG communicates with the existing control system over communication link 226.

Figure 3:
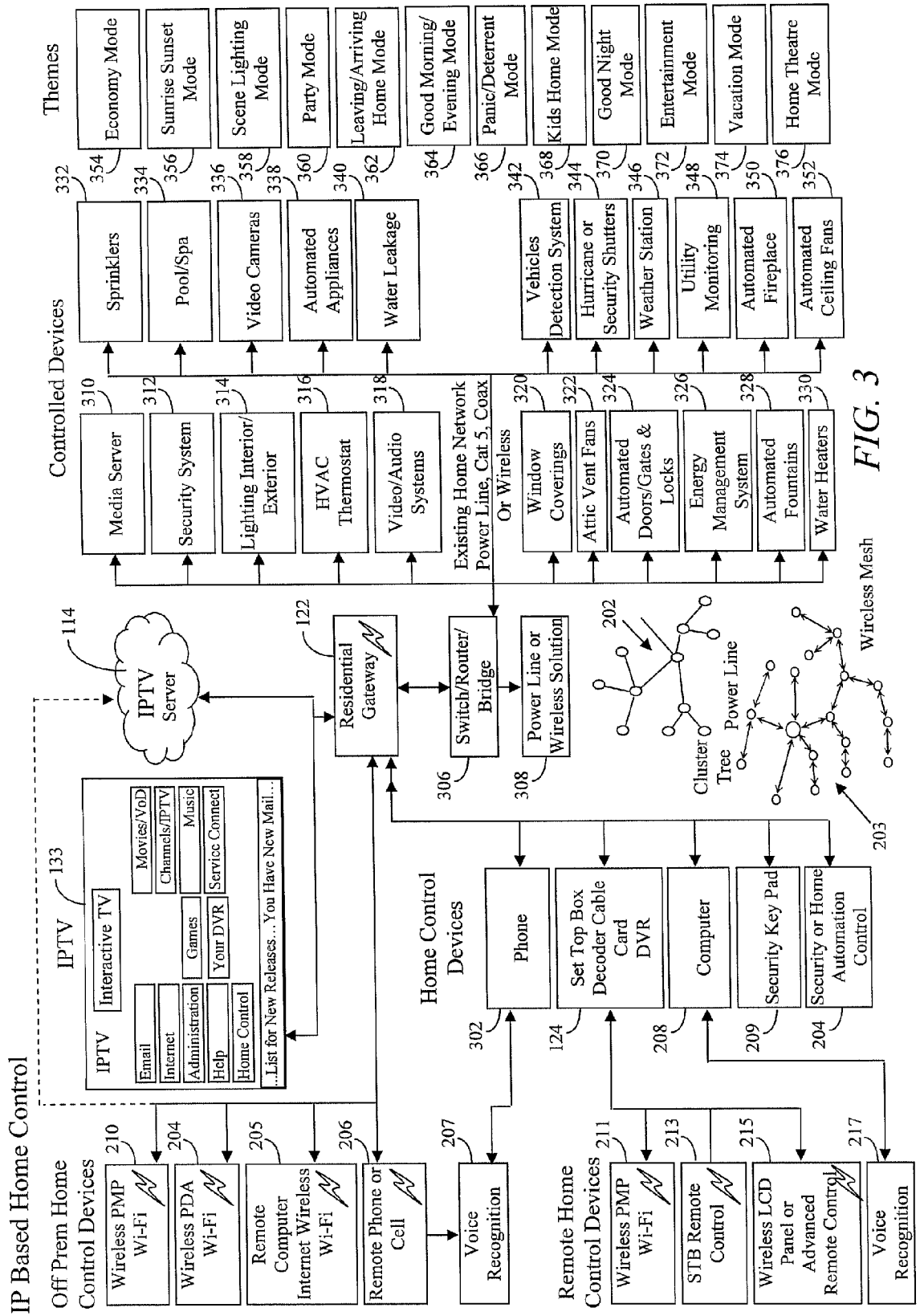
FIG. 3 is a schematic diagram depicting an illustrative embodiment showing a network of controlled devices.

Turning now to FIG. 3, in an illustrative embodiment the IPTV GUI 133 is accessible for viewing and input from all premise home control devices including but not limited to, wireless personal media player WIFI device 210, wireless PDA WIFI device 204, remote computer internet wireless WIFI device 205, and remote phone or cell phone 206. A voice recognition system 207 in conjunction with a cell phone, or wireless telephone may also access a verbally announced version of the GUI 133 to select appropriate control states and configure business rules to be applied to a device state and context. The GUI can be verbally announced over a telephone and requested input received over the telephone through the voice recognition system. Remote home control devices can also access a STB decoder or cable card 124 to access the RG and IPTV GUI to select content or configure the device state 117 and business rules.

Remote control home devices can include but are not limited to a wireless personal media player (PMP) 211, STB remote control 213, and a wireless LCD panel or advanced remote control 215. A voice recognition system 217 is also provided to interface with computer 208 microphone or other audio input devices such as a telephone. The RG 122 communicates with home control devices 302 phone, set top box decoder cable card DVR 124, computer 208, security keypad 209, and security or home automation control 204. The RG 122 also communicates with a switch/router/bridge 306 and a power line or wireless solution interface 308. The power line or wireless solution interface 308 communicates with the power line cluster tree 202 and the wireless mesh network 203. The switch/router/bridge 306 provides communications between the residential gateway and controllable devices.

The controllable devices (home automation controllable devices) may include, but are not limited to a media server 310, security system 312, lighting interior/exterior 314, heating, ventilation and heating, ventilation and air conditioning (HVAC) thermostat 316, video/audio systems 318, window coverings 320, attic vent fans 322, automated doors/gates and locks 324, energy management system 326, automated fountain 328, water heaters 330, sprinklers 332, pools/spas 334, video cameras 336, automated appliances 338, water leakage 340, vehicle detection systems 342, hurricane or security shutters 344, weather station 346, utility monitoring devices 348, automated fireplaces 350, and automated ceiling fans 352.

The control devices can be configured to implement particular themes or aggregated device states according to context, content and the business rules stored in the database. Themes or device states can be associated with particular user content, time of day, and context. Context may include but is not limited to a combination of subscriber or event participant identification, global alert context from the database, time, current or scheduled content and other associated events. Associated events include but are not limited to arrival, departure, alarm state, calendar, weather, holiday, global events, etc. Themes consist of but are not limited to economy mode 354, sunrise sunset mode 356, scene lighting mode 358, party mode 360, leaving/arriving home mode 362, good morning/evening mode 364, panic/deterrent mode 366, kids home mode 368, good night mode 370, entertainment mode 372, vacation mode 374, and home theater mode 376. A global alarm state may override a theme to interrupt a muted setting where phones and TVs are turned off to send a phone and TV alert to a subscriber.

Figure 4:
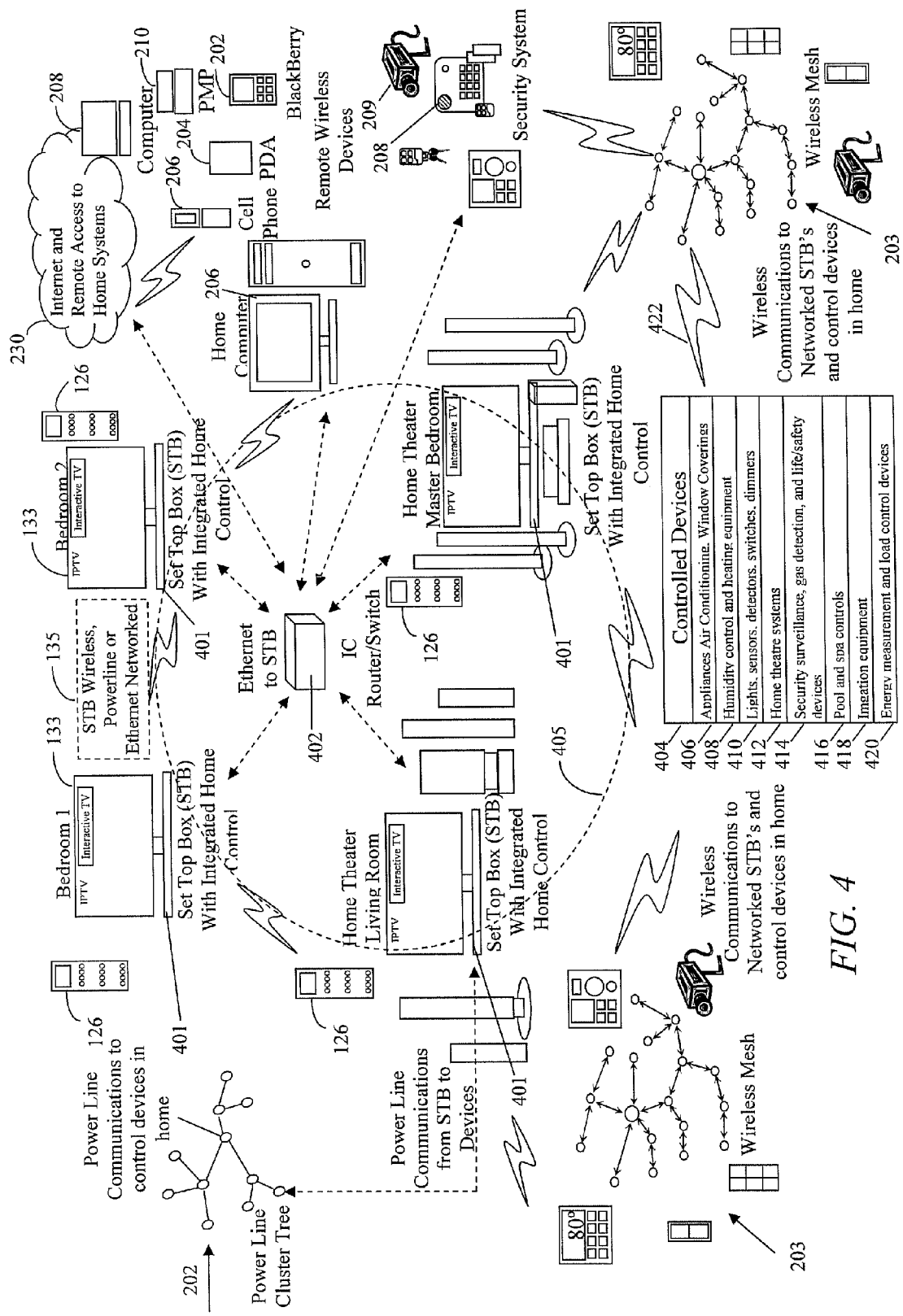
FIG. 4 is a schematic diagram depicting a particular illustrative embodiment showing a Set-top Box (STB) home and media controller in communication with controlled devices in a home.

Turning now to FIG. 4 in a particular illustrative embodiment a router/switch device 402 communicates with the HMC 401 on an STB with integrated home control. The HMC 401 receives a device state from the IPTV network server 114 and communicates the control state to devices in the home on a wireless network, over power lines or an Ethernet network 405. The device state includes but is not limited to home theater control settings associated with home theater content.

Devices or utilities controlled by or communicated with by the STB or HMC include but are not limited to other STBs or HMCs 401, a power line cluster tree 202, a wireless mesh network 203, the existing security system 208, home computer 206, and internet access to home systems 230 including home computer 208, personal media player 210, cell phone 206, PDS personal data assistant 204, and blackberry 202. The wireless mesh network communicates to network STBs and control devices in the home 404. The controllable devices 404 include but are not limited to appliances, air conditioning and window coverings 406, humidity control and heating equipment 408, light sensors, detector switches and dimmers 410, home theater systems 412, security surveillance, guest detection and lights/safety devices 414, pool and spa controls 416, irrigation equipment 418, and energy measurement and load control devices 420.

Figure 5:
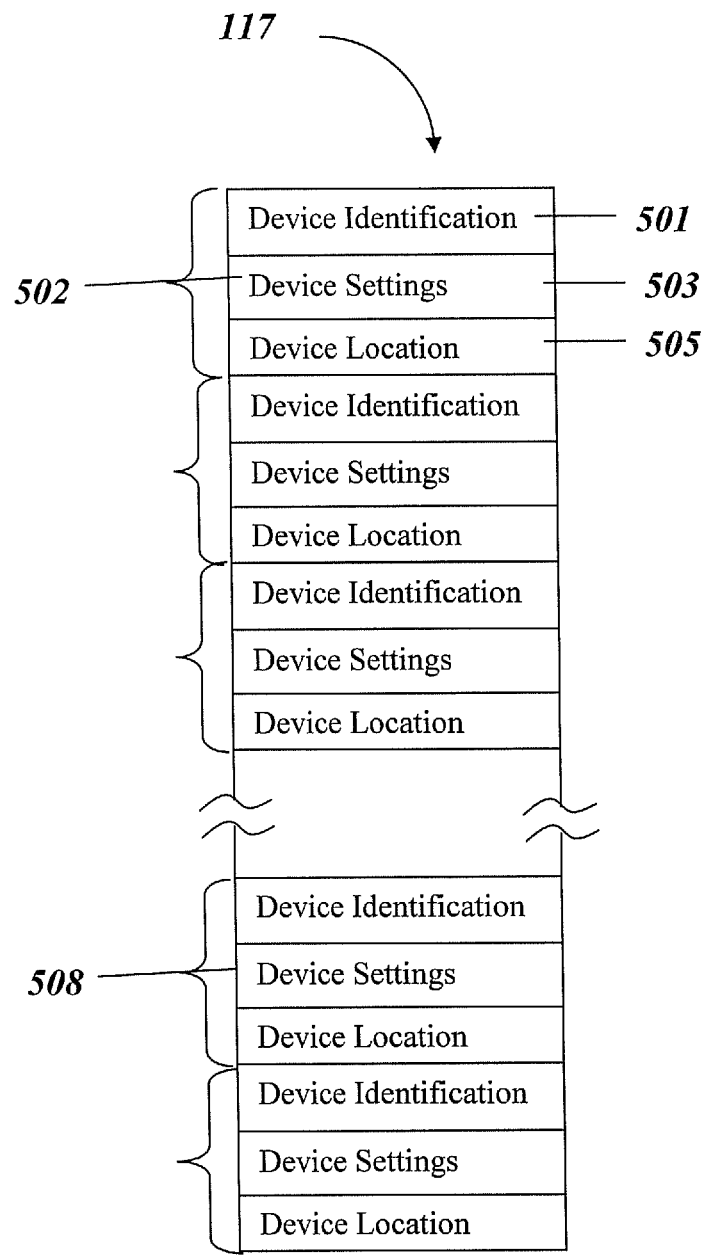
FIG. 5 is an illustration of a data structure for storing a device state in an illustrative embodiment.

Turning now to FIG. 5, FIG. 5 illustrates a data structure 117 for representing the configuration of a device state of the home automation controllable devices. A set of data structure fields is shown associated with the controlled devices represented in the device state. There can be multiple instances of each controlled device associated with a unique identifier in the data structure for uniquely representing multiple controlled devices in the device state.

Additional fields can be added to represent additional controlled devices. The device state is defined by fields in the data structure. Each device in a home is defined by a group 502 of device state definition fields. Each group 502 of device state definition fields includes but is not limited to a device identification field 501, a device settings field 503 and a device location field 505. A device state is defined for all devices in a home having a home automation system. A device state may include an alert message such as a global or security alert message stored in the device setting field 503 to be announced over an audio device or displayed on a display device.

Figure 6:
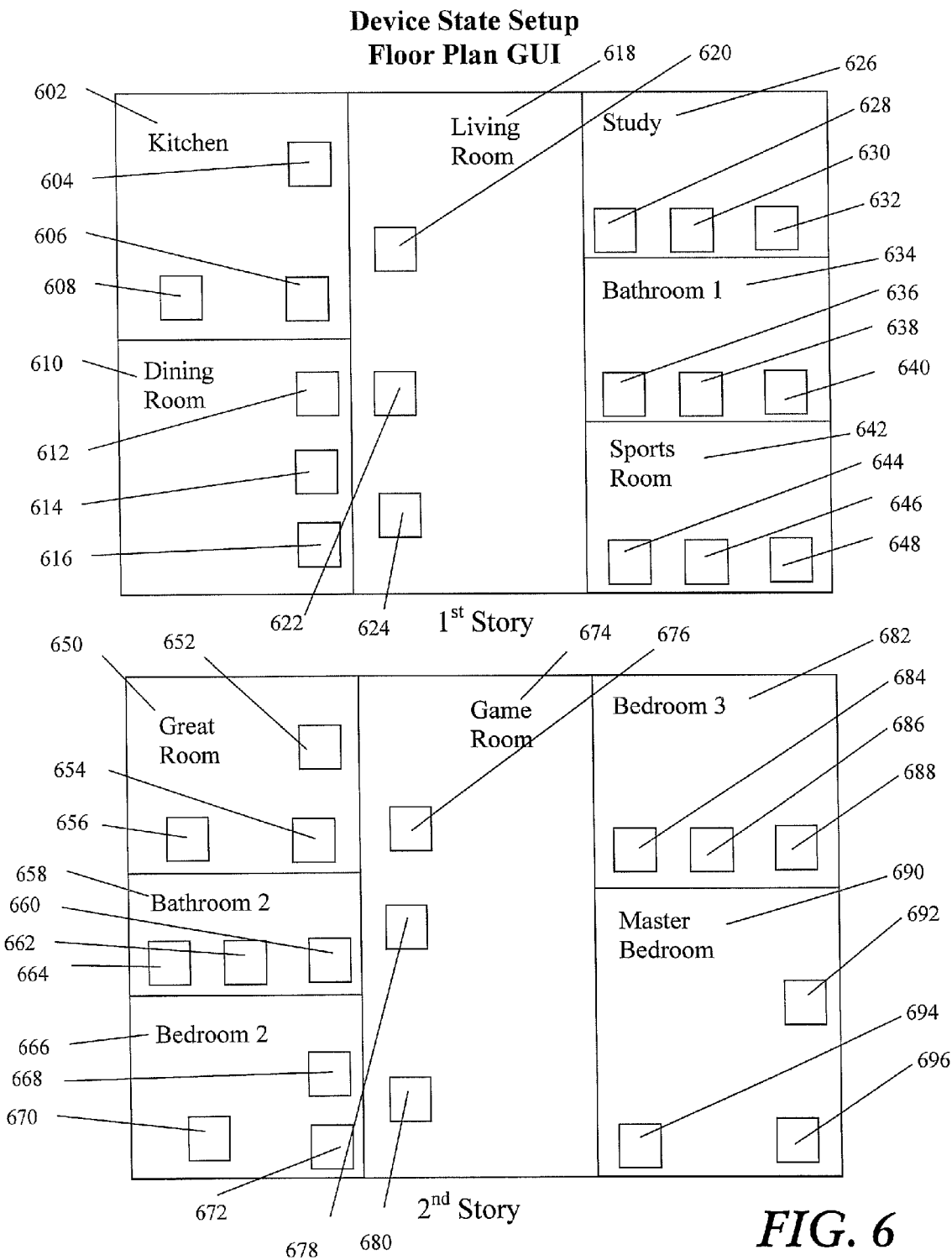
FIG. 6 is an illustration of an iconic representation of a device state for a home in a particular illustrative embodiment.

Turning now to FIG. 6, FIG. 6 is an iconic representation of the home control devices appearing in the GUI. Home automation controllable devices are shown as device icons. By placing a cursor on a device icon and right clicking, the device operational mode can be selected and stored in the device state data structure device setting field 503. Kitchen 602 controllable devices 604, 606, 608 represent but are not limited to devices such as microwave ovens, coffee pots, ovens, televisions, lights, phones, etc. Dining room 610 controllable devices 612, 614, 616 represent but are not limited to devices such as televisions, lights, radios, phones, etc. Living room 618 controllable devices 620, 622, 624 represent but are not limited to devices such as televisions, lights, stereos, DVD players, game systems, phones, etc. Study 626 controllable devices 628, 630, 632 represent but are not limited to devices such as personal computers, lights, fax machines, printers, phones, etc.

Bathroom 1 634 controllable devices 636, 638, 640 represent but are not limited to devices such as radios, lights, televisions, phones, etc. Sports room 642 controllable devices 644, 646, 648 represent but are not limited to devices such as lights, radios, televisions, satellite systems, DVD players, phones, etc. Great room 650 controllable devices 652, 654, 656 represent but are not limited to devices such as lights, televisions, stereos, DVD players, phones, etc. Bathroom 2 658 controllable devices 660, 662, 664 represent but are not limited to devices such as lights, televisions, radios, phones, etc. Bedroom 2 666 controllable devices 668, 670, 672 represent but are not limited to devices such as lights, televisions, stereos, DVD players, satellite systems, phones, etc.

Game room 674 controllable devices 676, 678, 680 represent but are not limited to devices such as lights, televisions, stereos, DVD players, satellite systems, phones, personal computers, etc. Bedroom 3 682 controllable devices 684, 686, 688 represent but are not limited to devices such as lights, televisions, stereos, DVD players, satellite systems, phones, etc. Master bedroom 690 controllable devices 692, 694, 696 represent but are not limited to devices such as lights, televisions, stereos, DVD players, satellite systems, phones, etc.

Figure 7:
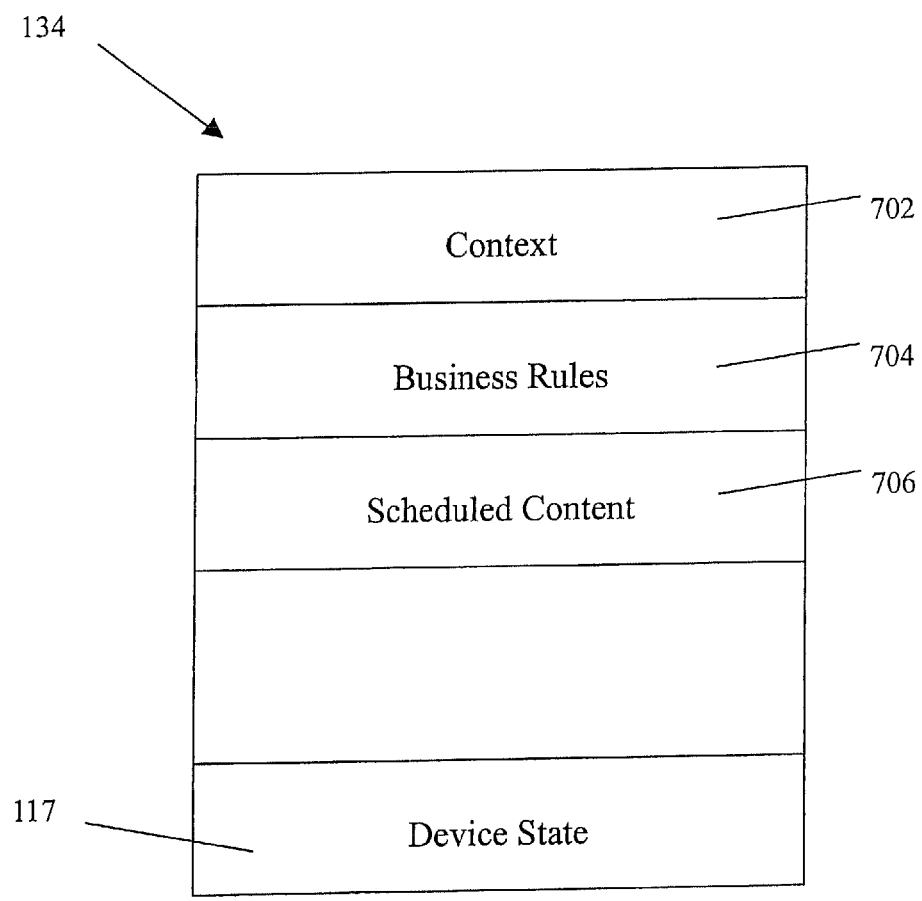
FIG. 7 is an illustration of a database in an illustrative embodiment.

Turning now to FIG. 7, FIG. 7 is a schematic diagram of a database in accordance with a particular illustrative embodiment. The illustrative embodiment database includes but is not limited to context at 702, business rules 704, scheduled content 706, and the device state 117. The database contains the business rules accessible to a processor for configuration of the device state 117. The device state 117 may be associated with a particular theme. The theme may be associated with a particular context 702. Thus, a subscriber may select a device state, configuring the lights and the control device, etc. in this house for a particular context (i.e. subscriber is dad, time Monday 8 pm, October, content is Monday Night Football). The context may also include parameters such as an event and event participant such as children arriving home from school. When the children enter the home their unique alarm code to the home security system identifies them as the kids arriving. If the time is between 3-5 pm, the home automation system or HMC can lock out access to television and computer games to enforce children doing their homework.

Figure 8:
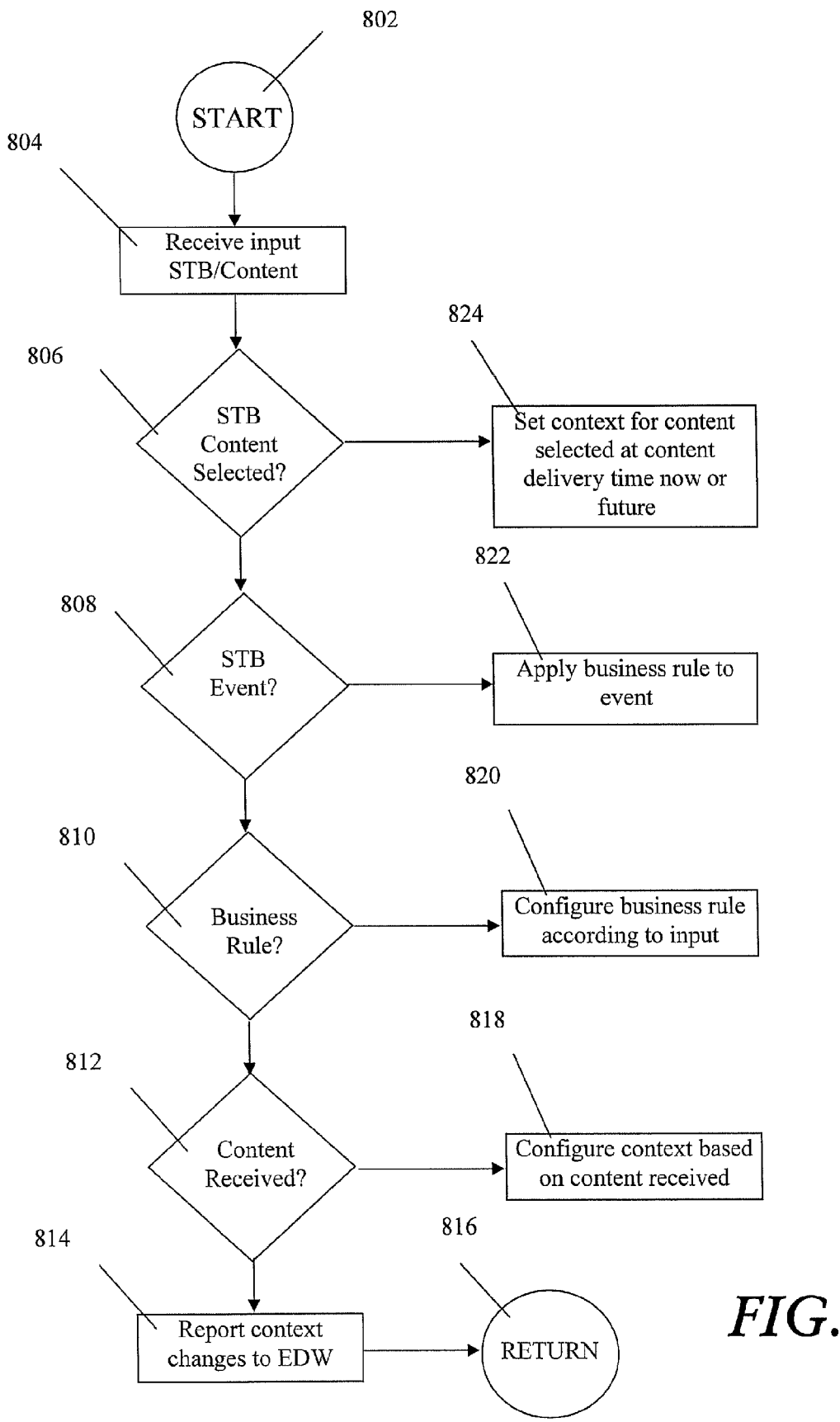
FIGS. 8-12 are flow charts illustrating methods performed in an illustrative embodiment.

Turning now to FIG. 8, FIG. 8 is a diagrammatic flow chart representation of a method performed by a computer system in accordance with a particular illustrative embodiment. The scenario starts at 802, as the server receives input STB/Content at 804. It is determined whether STB input (STB input is used herein as synonymous with subscriber input) or content is received at block 806. Whether an input or STB event is received is determined at block 808, whether a business rule is received is determined at block 810, whether content is received is determined at block 812. The method then reports context changes to EDW at block 814 and then returns at block 816. When STB/Content block 806 is received, the context is set for content selected at content delivery time either now or at a future time at block 824. Block 824 is described in more detail in FIG. 9. When an event 808 is input, a business rule is applied to event 822. Block 822 is described in more detail in FIG. 10. When business rule 810 is received the business rule is configured according to input 820. Block 820 is described in more detail in FIG. 11. When content is received at block 812 as an input, the context is configured based on the nature of the content received at block 818. Block 818 is described in more detail in FIG. 12. The nature of the content includes content characterization (sports, news, movies, title, type, etc.) and program name (Monday Night Football).

Figure 9:
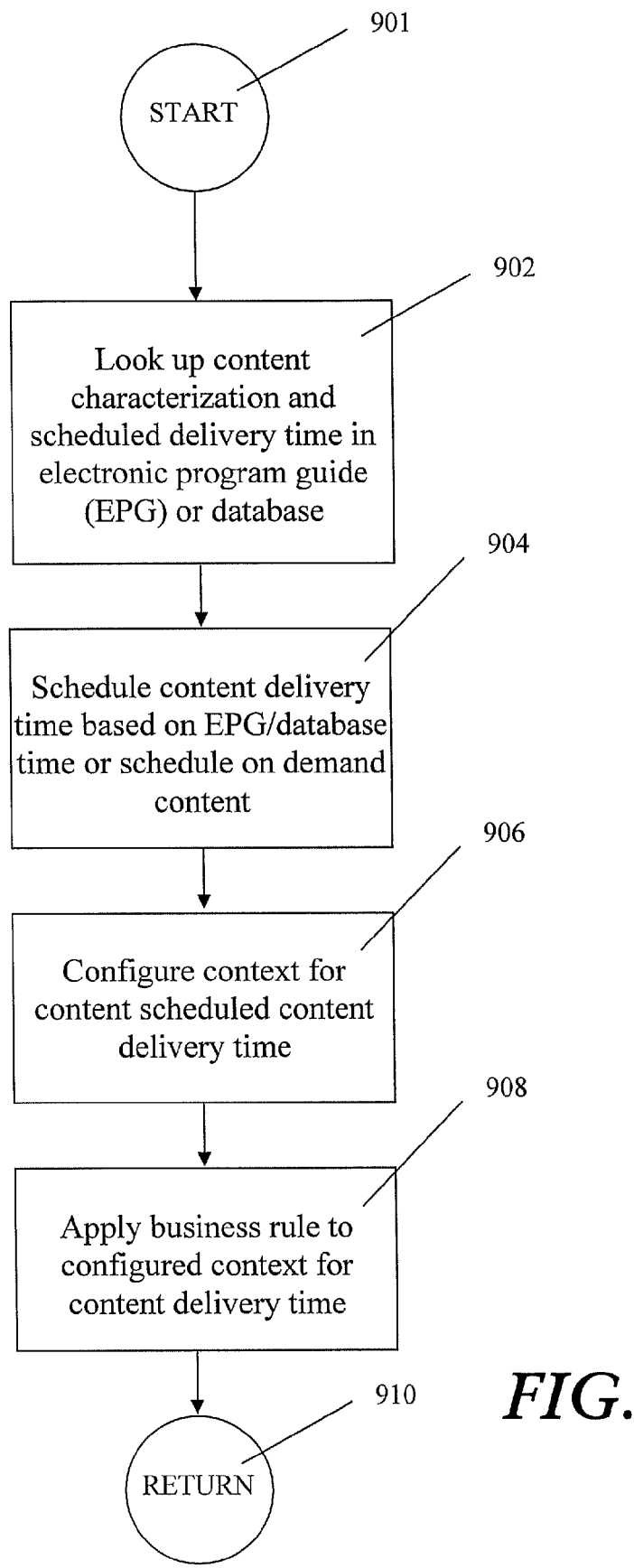

Turning now to FIG. 9, FIG. 9 is a diagrammatic representation of a method performed by a computer system in accordance with a particular illustrative embodiment. FIG. 9 is an expansion of block 824 in FIG. 8. The scenario starts at 901 by the looking up of content characterization and scheduled delivery time in an electronic program guide (EPG) or database at 902. The method schedules the content delivery time based on EPG/database time or schedules "on demand" content at block 904. The method then configures the context according to the scheduled content delivery time at block 906, and applies a business rule to configured context for content delivery time at block 908 and returns at block 910.

Figure 10:
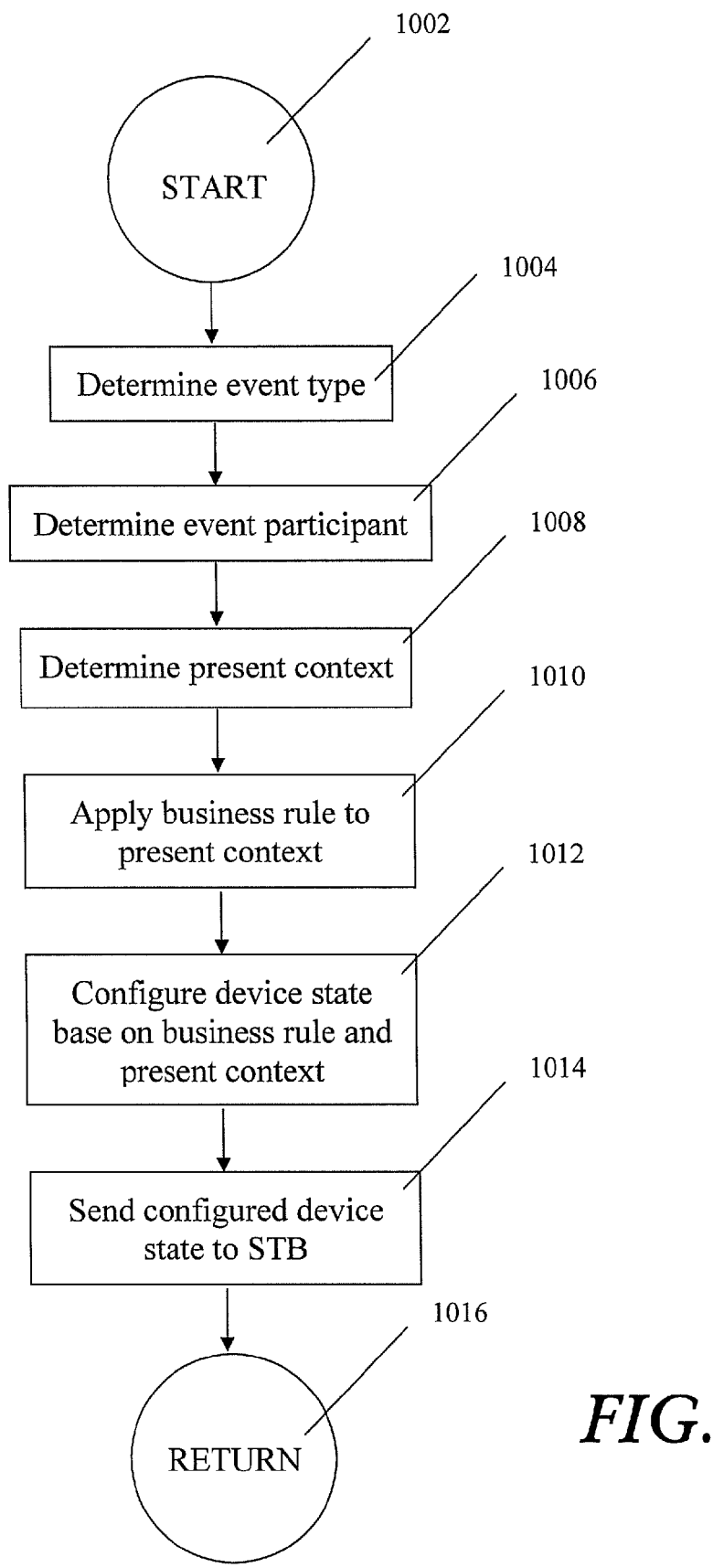

Turning now to FIG. 10, FIG. 10 is a diagrammatic representation of a method performed by a computer system in accordance with a particular illustrative embodiment. FIG. 10 is an expansion of block 822 in FIG. 8. The scenario starts at block 1002, determines event type at block 1004, determines event participant at block 1006, determines present context at block 1008, applies a business rule to present context block 1010, configures the device state based on the business rule and present context at block 1012, and sends the configured device state to STB at block 1014 and then returns at block 1016.

Figure 11:
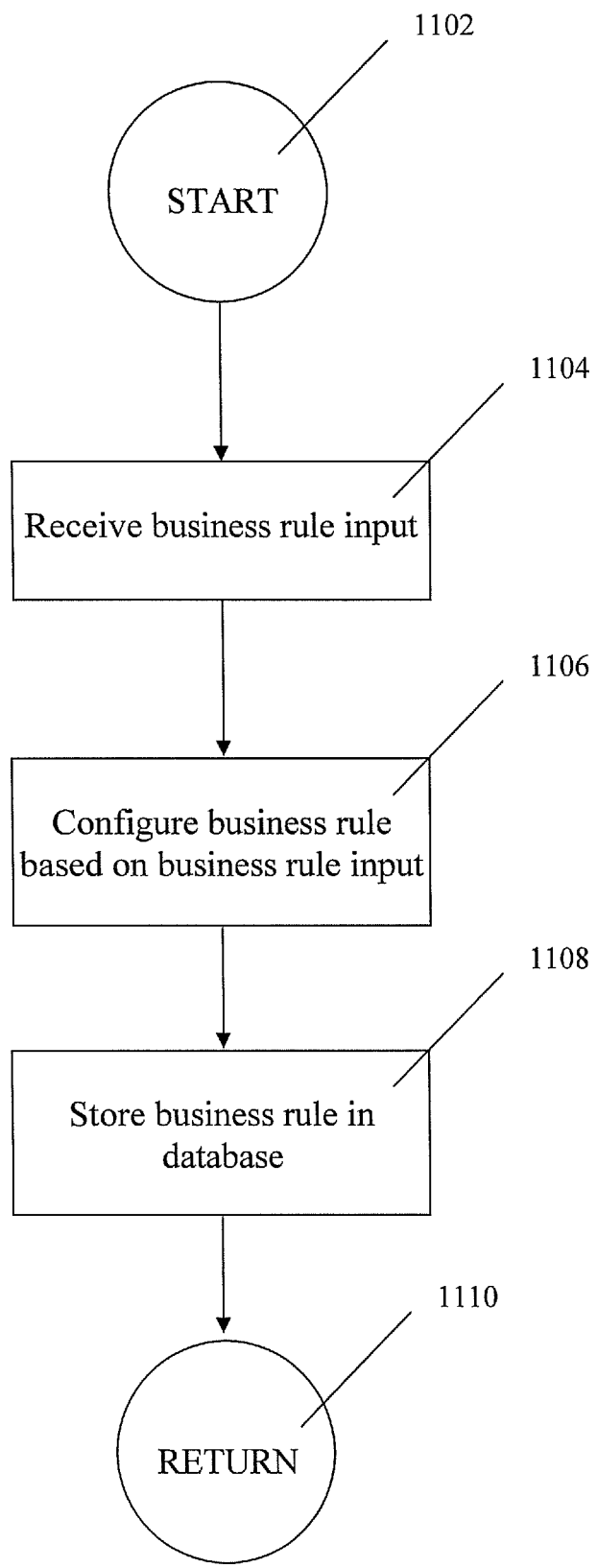

Turning now to FIG. 11, FIG. 11 is a diagrammatic flow chart representation of a method performed by a computer system in accordance with a particular illustrative embodiment. FIG. 11 is an expansion of block 820 in FIG. 8. The illustrative embodiment scenario starts at 1102, receives business rule input at block 1104, configures business rule based on business rule input at block 1106, stores business rule in database at block 1108, and then returns at block 1110.

Figure 12:
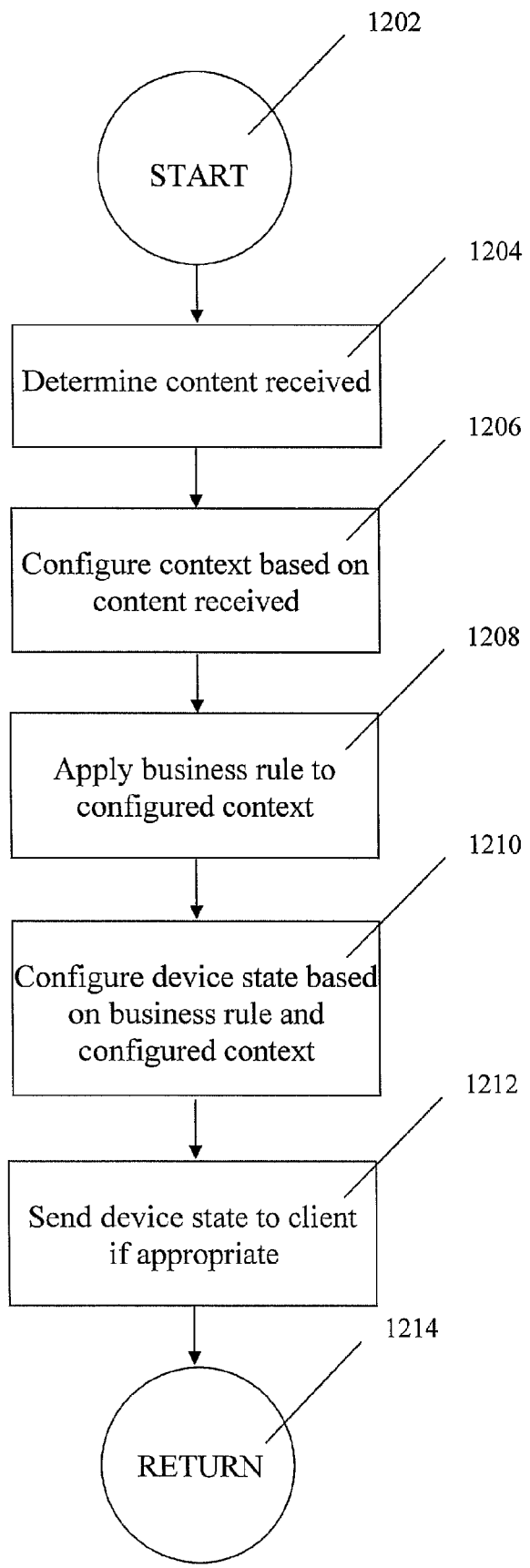

Turning now to FIG. 12, FIG. 12 is a flow chart representation of a method performed by a computer system in accordance with an illustrative embodiment. FIG. 12 is an expansion of block 818 in FIG. 8. The scenario starts 1202, determines what content is received at block 1204, configures context based on what content is received at block 1206, applies a business rule to configured context at block 1208, configures device state based on the business rule and configured context at block 1210, sends device state to client if appropriate at block 1212, and then returns at block 1214.

Figure 13:
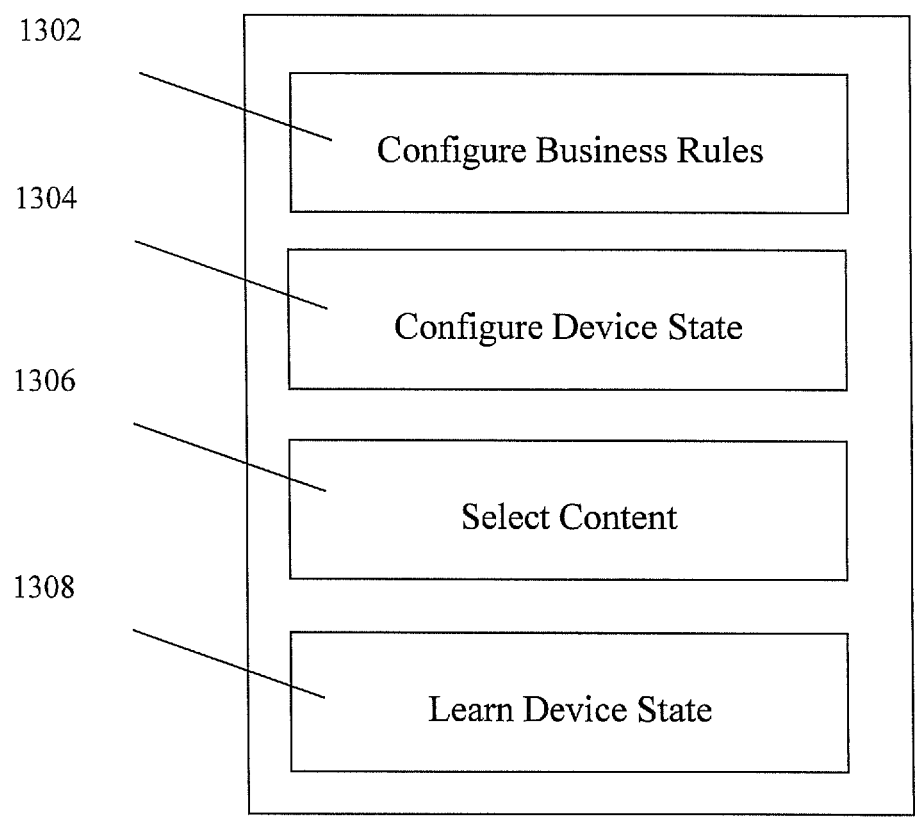
FIG. 13 is an illustration of a GUI in an illustrative embodiment.

Turning now to FIG. 13, FIG. 13 is a diagrammatic representation of the graphical user interface in accordance with an illustrative embodiment of the present invention. The GUI of FIG. 13 allows a subscriber to configure business rules at block 1302, configure device state at block 1304, select content at block 1306, and learn device state at block 1308. The business rules can be configured as entered via text input of spoken through the voice recognition system. An interpreter in the voice recognition system translates the spoken commands into executable business rules stored in the database. The device state can be configured using a GUI such as the GUI shown in FIG. 6. The content can be selected using an IPTV GUI for content selection. The learn device state icon 1208 enables a subscriber to store the current device state for the home along with the context. The context may include but is not limited to a particular subscriber, content and time of day.

Figure 14:
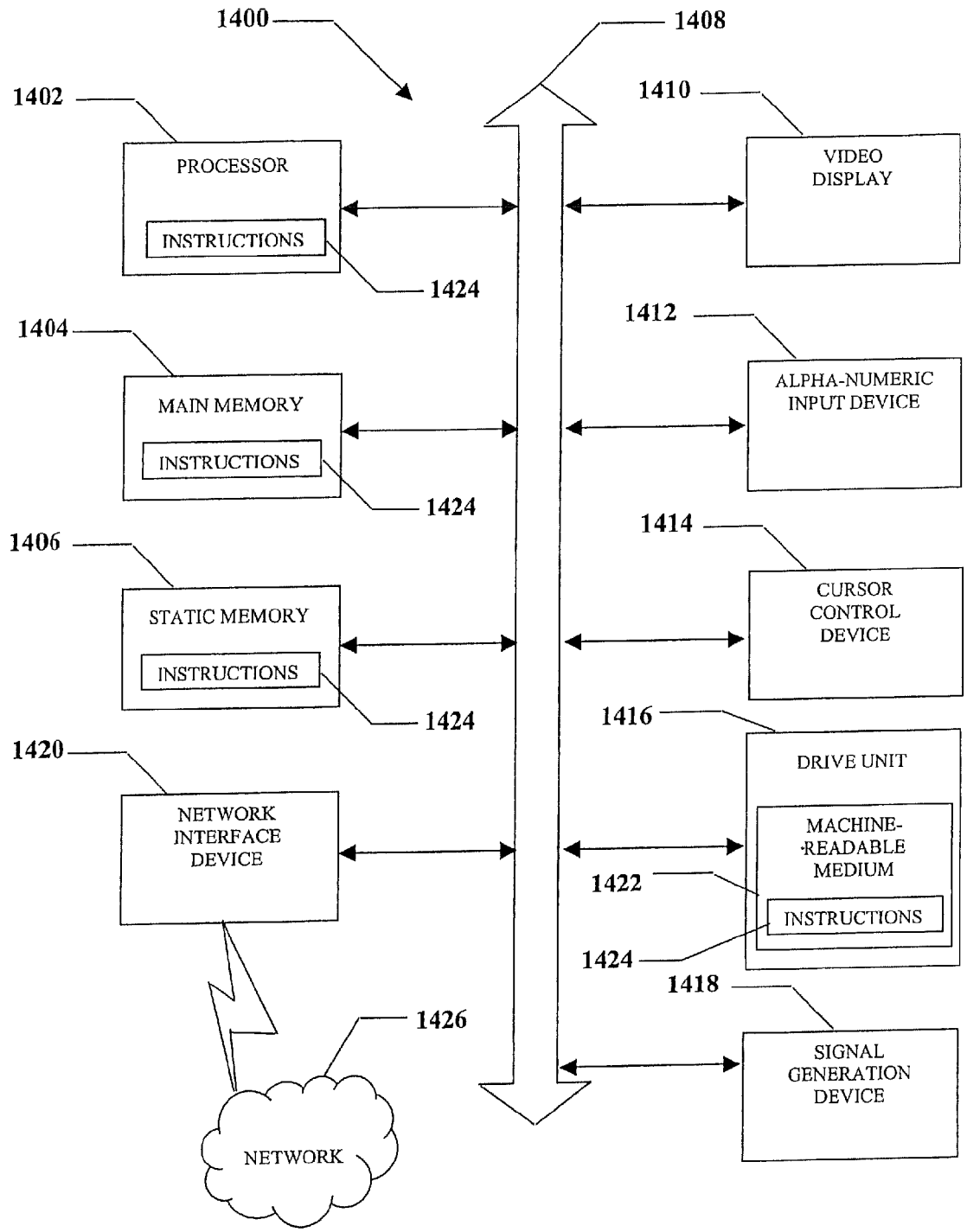
FIG. 14 is a diagrammatic representation of a machine in the form of a computer system within which a set of instructions, when executed, may cause the machine to perform any one or more of the methodologies of the illustrative embodiment.

Turning now to FIG. 14, FIG. 14 is a diagrammatic representation of a machine in the form of a computer system 1400 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the illustrative includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1400 may include a processor 1402 (e.g., a central processing unit (CPU), a graphics processing unit (GPU), or both), a main memory 1404 and a static memory 1406, which communicate with each other via a bus 1408. The computer system 1400 may further include a video display unit 1410 (e.g., a liquid crystal display (LCD), a flat panel, a solid state display, or a cathode ray tube (CRT)). The computer system 1400 may include an input device 1412 (e.g., a keyboard), a cursor control device 1414 (e.g., a mouse), a disk drive unit 1416, a signal generation device 1418 (e.g., a speaker or remote control) and a network interface device 1420.

The disk drive unit 1416 may include a machine-readable medium 1422 on which is stored one or more sets of instructions (e.g., software 1424) embodying any one or more of the methodologies or functions described herein, including those methods illustrated in herein above. The instructions 1424 may also reside, completely or at least partially, within the main memory 1404, the static memory 1406, and/or within the processor 1402 during execution thereof by the computer system 1400. The main memory 1404 and the processor 1402 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the illustrative embodiment, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrative embodiment contemplates a machine readable medium containing instructions 1424, or that which receives and executes instructions 1424 from a propagated signal so that a device connected to a network environment 1426 can send or receive voice, video or data, and to communicate over the network 1426 using the instructions 1424. The instructions 1424 may further be transmitted or received over a network 1426 via the network interface device 1420.

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the illustrative embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the illustrative embodiment is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the illustrative embodiment is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "illustrative embodiment" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the illustrative embodiment has been described with reference to several illustrative embodiments, it is understood that the words that have been used are words of description and illustration, rather than words of limitation. Changes may be made within the purview of the appended claims, as presently stated and as amended, without departing from the scope and spirit of the illustrative embodiment in its aspects. Although the illustrative embodiment has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present illustrative embodiment, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

The invention claimed is:

1. A non-transitory machine readable medium containing a computer program comprising instructions that when executed by a computer, perform functions to configure a device state of a home automation controllable device, the computer program comprising:
   instructions to use channel selection data to access nature of content data in an electronic program guide;
   instructions to use subscriber identity data and the nature of content data to access stored device state data wherein the stored device state data indicates a plurality of operational states comprising on, off, dimmer, variable power, volume and flicker associated with stored context data for the subscriber identity data and nature of content data; and
   instructions to send the stored device state data from an internet protocol television server to the client device to configure the home automation controllable device to one of the plurality of operational states.

2. The medium of claim 1, the computer program further comprising:
   instructions to receive at an internet protocol television server, subscriber identity data and internet protocol television channel selection data input from a client device.

3. The medium of claim 1, wherein the stored context data further comprises learned context data for the subscriber identity data and the nature of content data, wherein the learned context data comprises subscriber name, content name, date and time of day and device state for the home automation controllable device.

4. The medium of claim 1, wherein the nature of content data further comprises a program name and wherein the home automation controllable device further comprises a security system.

5. A tangible non-transitory machine readable medium having stored thereon a data structure for storing at a server, device state data for a home automation controllable device, the data structure comprising:
   a computer program comprising instructions that when executed by a computer, perform functions to configure a device state of the home automation controllable device, the computer program comprising:
      instructions to use channel selection data to access nature of content data in an electronic program guide;
      instructions to use subscriber identity data and the nature of content data to access the stored device state data wherein the stored device state data indicates a plurality of operational states comprising on, off, dimmer, variable power, volume and flicker for the home automation controllable device in accordance with content characterization data; and
      instructions to send the stored device state data from an internet protocol television server to a client device to configure the home automation controllable device to one of the plurality of operational states;
   a nature of content field for storing data indicating the nature of content data accessed from the electronic program guide for the channel selection data; and
   a learned context field for storing learned context data for the device state data in accordance with the nature of content data and the subscriber identity data, wherein the context characterization data further comprises the nature of content data to configure a device state for the home automation controllable device to one of a plurality of operation states in accordance with the learned context data, subscriber data and nature of content data.

6. The medium of claim 5, wherein the learned context data further comprises a scheduled content time data, video content characterization data, event data, and event participant data.

7. The medium of claim 5, wherein the data structure further comprises:
   a business rule field for storing a business rule for application to the learned context data and an input.

8. A tangible non-transitory machine readable medium containing a computer program comprising instructions that when executed by a computer, perform functions to configure a device state of a home automation controllable device, the computer program comprising:
   instructions to send a learned context data input indicating a plurality of operational states comprising on, off, dimmer, variable power, volume and flicker in accordance with subscriber identity data and content characterization data for a channel selection data from a client device to a server for configuring a learned device state in a database at the server in accordance with the learned context data input, wherein the content characterization data further comprises nature of content data accessed in an electronic program guide for the channel selection data to configure the device state for the home automation controllable device in the database at the server in accordance with the learned context data input, subscriber identity data and nature of content data; and
   instructions to receive the configured device state indicating one of the operational states from the server at the client device, wherein the configured device state is used to configure the home automation controllable device to one of the plurality of operational states.

9. The medium of claim 8, wherein the learned context data input further comprises stored device state data associated with stored context data for the subscriber identity data and nature of content data for display during a commercial break in the content data.

* * * * *